(No Model.) 2 Sheets—Sheet 1.
C. W. NICHOLSON.
PEANUT STRIPPER.
No. 370,278. Patented Sept. 20, 1887.
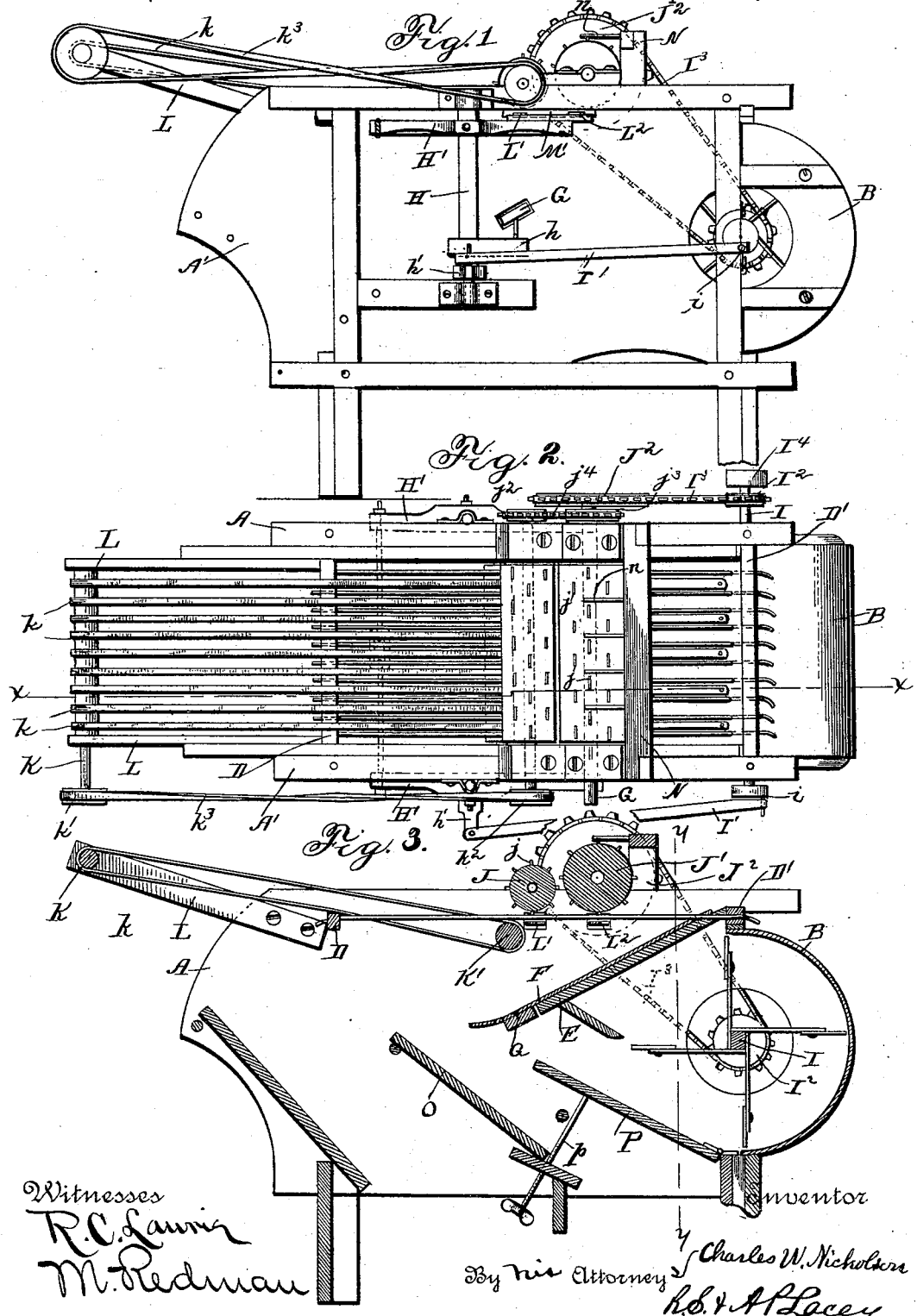
Witnesses
R. C. Laurie
M. Redman
Inventor
Charles W. Nicholson
By his Attorneys
R. S. & A. P. Lacey

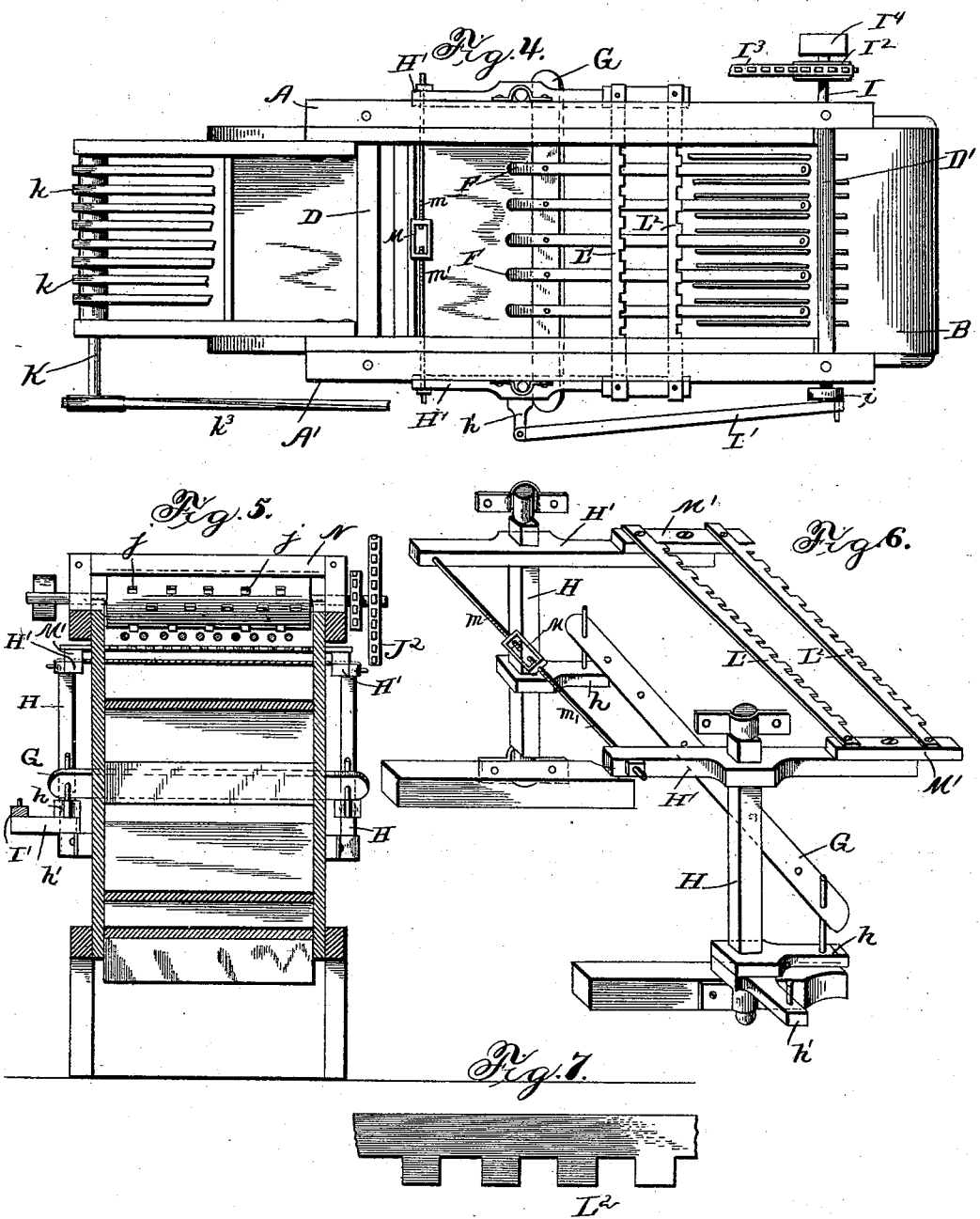

UNITED STATES PATENT OFFICE.

CHARLES WESLEY NICHOLSON, OF ASSAMOOSICK, VIRGINIA.

PEANUT-STRIPPER.

SPECIFICATION forming part of Letters Patent No. 370,278, dated September 20, 1887.

Application filed December 3, 1886. Serial No. 220,596. (No model.)

*To all whom it may concern:*

Be it known that I, CHARLES WESLEY NICHOLSON, a citizen of the United States, residing at Assamoosick, in the county of Southampton and State of Virginia, have invented certain new and useful Improvements in Peanut-Strippers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to strippers, and is principally designed for separating peanuts from their vines.

The object of the invention is to simplify and improve the construction of this class of devices, and especially of that patented to me December 2, 1884, No. 308,690, whereby the efficiency and durability are increased.

The improvement consists in the novel features, hereinafter more fully described, claimed, and shown in the annexed drawings, in which—

Figure 1 is a side view of a vine and seed stripping machine embodying my invention; Fig. 2, a plan view of the same; Fig. 3, a section on the line $x\ x$ of Fig. 2; Fig. 4, a plan view, some of the parts being broken away and having the feed-rolls removed; Fig. 5, a transverse sectional view on the line $y\ y$ of Fig. 3. Fig. 6 is a perspective view of the saws, agitator-bar, and their operating mechanism on an enlarged scale; and Fig. 7, a detail view of the saws.

The frame and casing of the machine comprise the sides A and A' and the fan-case B, situated at the front or feed end of the machine between the side boards, A and A'. On the frame is placed the separating-frame, composed of bars, wires, or suitable rods arranged parallel with the side boards and supported by end cross-bars, D and D'. The agitator-table E, extended between the sides, has its upper end fitted close under the separating-frame and inclines downward and rearward. The agitator-bars F, supported on the agitator-table in planes substantially parallel with the sides of the casing, have their upper ends pivoted to the agitator-table and their lower ends pivotally secured to the slide G, adjacent to the end of the agitator-table, and having its ends projected through the sides A and A' and connected with the arm $h$ on the rock-shaft H. There are two such rock-shafts H, (see Fig. 6,) one located on each side of the case, and each has an arm, $h$, to which the slide is connected. The arm $h'$, projecting from one of the rock-shafts, is connected with the crank $i$ of the fan-shaft I by the link I'.

Above the separating-frame, at a short distance from the forward edge thereof, a presser provided with teeth is arranged. It comprises two rollers, J and J', journaled between the sides A and A', and having their lower surfaces approaching close to the separating-frame. The teeth $j$ are adapted to project into the space between the bars of the separating-frame and push the vines between said bars. The journals of the pressing-rolls are extended beyond the sides, and are geared together at one end by the sprocket-wheels $j^2\ j^3$ and the sprocket-chain $j^4$, and one of said journals is geared with the fan-shaft by the sprocket-wheels $J^2\ I^2$ and the sprocket-chain $I^3$. The fan-shaft is extended beyond the sprocket-wheel $I^2$, and is provided with the band-pulley $I^4$, which is driven from any suitable source of power.

The presser rolls are of different size and revolve at unequal rates of speed, the rear roller revolving at the higher rate of speed to throw the vines after being stripped onto the remover, composed of a series of endless strands or belts, $k$, passing around rollers K K'. The roller K' is located below the separating-frame just in the rear of or directly in a vertical line with the rear portion of the presser-roll J', and the roller K is mounted in arms L, projecting rearwardly from the upper rear corners of the sides of the case, and has its journal extended on one side beyond the adjacent arm and provided with a band-pulley, $k'$, around which and a corresponding pulley, $k^2$, on the presser-roll J, the endless band $k^3$ passes. A cutter extends parallel with the presser-rolls, and is arranged beneath the separating-frame directly below the axis of said rolls, or nearly so. It is composed of two saw-blades, L' and L², having their teeth projecting toward the feed end or front of the machine. The ends project beyond the sides of the case and are connected with the forward ends of the levers H', secured upon the rock-shaft H. The rear ends of these levers are adjustably connected by the rods $m$ $m'$ and the adjustable coupling M. In case the saws become slack they are tightened by drawing the rear ends of the levers H' together. The saws are located at a distance apart and are connected with the equalizers M', pivotally secured between their ends to the levers H'. By this arrangement an equal tension is preserved upon both saws. The arch N, located in front of the presser-roll J', has spring cleaner-teeth $n$ projecting therefrom, which bear with their free ends upon said roll and remove any vines or foreign matter that might be accidentally taken up by said roll.

An oppositely-inclined or return board, O, is placed in the rear of the agitator-table and directs the peanuts to a chute near the front end of the machine, through which they are delivered into a suitable vessel set for their reception. The nuts, as they fall from the agitator-table onto the return-board, are subjected to a blast of air from the fan in the fan-case. The hinged board P, inclining rearwardly and upwardly, is adjustable to regulate the force and direction of the blast. It is adjusted and held in an adjusted position by the set-screw $p$.

In the practical operation of the machine motion may be imparted to the several parts in any suitable way; but for compactness of arrangement the means shown and hereinbefore described are preferred. The fan-shaft being driven from any suitable source of power, motion is transmitted therefrom to the rock-shaft by the crank $i$, link I', and arm $h'$, and to the presser-roll J' by the sprocket-chain $I^3$ and sprocket-wheels $J^2$ $I^2$, from the presser-roll J' to the presser-roll J by the sprocket-chain $j^4$ and sprocket-wheels $j^2$ $j^3$, and from the presser-roll J to the removing-carrier by the endless band $k^3$ and the pulleys $k'$ $k^2$. The machine being set in motion, the vines are placed upon the separating-frame in advance of the presser-roll J' and pushed forward till engaged by said roller, when they will be carried forward. The teeth, catching into the vines, carry them forward and force them a sufficient distance below the separating-frame to permit the peanuts to drop beyond the plane of the saws, which will sever the stems without doing injury to the nuts. Any nuts escaping the first saw will be separated from the vine by the second saw. The vines, after passing between the separating-frame and the presser-rolls, are thrown onto the removing-carrier, by which they are delivered over the rear end of the machine. The nuts, falling onto the agitator-table, gravitate toward the lower end, being assisted in their travel by the motion of the agitators, which loosens any dirt that may be clinging thereto, and fall thence onto the return-board. In their transit from the agitator-table to the return-board the blast of air removes all foreign matter, dust, broken vines, &c.

The saw-teeth have their sides parallel and the ends straight. This form of tooth has been found to give the best results, as the cutting-edge is at right angles to the direction of travel of the vines. If the cutting-edge of the saw for this purpose were inclined, it would permit the stem to slip, so that the nut would be drawn close up between the teeth and considerably injured by breaking or marring the shell. The square form of tooth described and shown obviates this objection and gives superior results.

Having thus described my invention, what I claim, and desire to secure by Letters Patent, is—

1. The combination, with the separating-frame formed of bars, and the saws, of the presser having teeth extending into the spaces between the bars of the separating-frame, as and for the purpose described.

2. The combination, with the separating-frame composed of bars, and the saws, of the presser-rolls and means for revolving them at unequal rates of speed in the same direction, said rolls being provided with teeth extending into the spaces between the bars of the separating-frame, as and for the purpose described.

3. The combination of the separating-frame, the saws, the two presser-rolls, means for revolving the rolls at unequal rates of speed, the removing-carrier composed of a series of endless strands or belts, and supporting-rollers, substantially as set forth.

4. The combination, with the separating-frame and the presser, of the rock-shafts, the levers, the equalizers, and the saws uniting the forward ends of the levers, and means for adjustably connecting the rear ends of the levers, substantially as described.

5. The combination of the separating-frame, the presser-rollers, the rock-shafts, the levers, means for adjustably connecting the levers at one end, and the saws, substantially as and for the purpose specified.

6. In a vine-stripper, the combination of the separating-frame, the presser, and the saws provided with teeth having parallel cutting-edges and straight ends, substantially as and for the purpose described.

In testimony whereof I affix my signature in presence of two witnesses.

CHARLES WESLEY NICHOLSON.

Witnesses:
H. A. MOORE,
GEO. H. LEIGH.